US008880610B2

(12) United States Patent
Ernest et al.

(10) Patent No.: US 8,880,610 B2
(45) Date of Patent: Nov. 4, 2014

(54) MANAGING LOCALLY INITIATED ELECTRONIC MAIL ATTACHED DOCUMENTS

(75) Inventors: Leslie Mark Ernest, Knoxville, MD (US); Craig Fellenstein, Brookfield, CT (US); Rick A. Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1969 days.

(21) Appl. No.: 10/660,337

(22) Filed: Sep. 11, 2003

(65) Prior Publication Data

US 2005/0060375 A1    Mar. 17, 2005

(51) Int. Cl.
*G06F 15/16*     (2006.01)
*G06Q 10/10*     (2012.01)

(52) U.S. Cl.
CPC .................................. *G06Q 10/107* (2013.01)
USPC ............................ 709/206; 709/201; 709/205

(58) Field of Classification Search
USPC .................................. 709/201–207, 217–227
See application file for complete search history.

(56) References Cited

U.S. PATENT DOCUMENTS

| | | | |
|---|---|---|---|
| 5,432,928 A | | 7/1995 | Sherman |
| 5,781,901 A * | | 7/1998 | Kuzma ............................ 707/10 |
| 6,073,133 A | | 6/2000 | Chrabaszcz |
| 6,182,080 B1 | | 1/2001 | Clements |
| 6,256,672 B1 * | | 7/2001 | Redpath ........................ 709/232 |
| 6,275,848 B1 * | | 8/2001 | Arnold .......................... 709/206 |
| 6,351,763 B1 * | | 2/2002 | Kawanaka .................... 709/206 |
| 6,505,236 B1 | | 1/2003 | Pollack |
| 6,628,306 B1 * | | 9/2003 | Marchionda .................. 715/752 |
| 6,687,741 B1 * | | 2/2004 | Ramaley et al. .............. 709/206 |
| 6,785,712 B1 * | | 8/2004 | Hogan et al. ................. 709/206 |
| 6,839,741 B1 * | | 1/2005 | Tsai .............................. 709/217 |

(Continued)

FOREIGN PATENT DOCUMENTS

| | | |
|---|---|---|
| JP | 2000003314 | 1/2000 |
| JP | 2001251361 | 9/2001 |

(Continued)

OTHER PUBLICATIONS

Snibbe et al.; Haptic Techniques for Media Control, In Proceedings of the 14th Annual ACM Symposium on User Interface Software and Technology (UIST 2001), Orlando, Florida, Nov. 2001, 10 pages.

(Continued)

*Primary Examiner* — Richard G Keehn
(74) *Attorney, Agent, or Firm* — Schmeiser, Olsen & Watts, LLP; Mark C. Vallone

(57) ABSTRACT

The present invention introduces unique functionality whereby there is a substantial reduction in the storage and replication requirements for the locally initiated electronic mail messages, which include locally sourced attachments. In the method of the present invention, at the origination location of an electronic message, there is an identification of electronic messages containing locally sourced attachment documents. During the storage of the transmitted message, there is determination of whether any attachment to the message was a locally sourced attachment. If the attachment was a locally sourced attachment, the attachment may not be stored with the message. Instead a pointer or link can be created to the original or locally sourced document. This approach will reduce the storage space required by electronic messages.

18 Claims, 8 Drawing Sheets

(56) References Cited

U.S. PATENT DOCUMENTS

| | | | |
|---|---|---|---|
| 6,915,333 B2* | 7/2005 | Delia et al. | 709/206 |
| 7,003,551 B2* | 2/2006 | Malik | 709/206 |
| 7,035,902 B1* | 4/2006 | Bates et al. | 709/206 |
| 7,155,481 B2* | 12/2006 | Prahlad et al. | 709/206 |
| 7,251,680 B2* | 7/2007 | DeVos | 709/206 |
| 7,257,639 B1 | 8/2007 | Li et al. | |
| 7,870,089 B1* | 1/2011 | Hall et al. | 707/694 |
| 7,933,957 B2* | 4/2011 | Daniell | 709/206 |
| 2001/0047389 A1 | 11/2001 | Prahlad et al. | |
| 2001/0054073 A1* | 12/2001 | Ruppert et al. | 709/206 |
| 2002/0116641 A1* | 8/2002 | Mastrianni | 713/201 |
| 2002/0120678 A1* | 8/2002 | Jones et al. | 709/203 |
| 2002/0198944 A1* | 12/2002 | Moss | 709/206 |
| 2003/0005065 A1* | 1/2003 | Lin et al. | 709/206 |
| 2003/0023697 A1 | 1/2003 | Okada | |
| 2003/0041112 A1* | 2/2003 | Tada et al. | 709/206 |
| 2003/0115273 A1* | 6/2003 | Delia et al. | 709/206 |
| 2003/0231207 A1* | 12/2003 | Huang | 345/752 |
| 2004/0034688 A1* | 2/2004 | Dunn | 709/206 |
| 2004/0064733 A1* | 4/2004 | Gong | 713/201 |
| 2004/0068545 A1* | 4/2004 | Daniell et al. | 709/206 |
| 2004/0158607 A1* | 8/2004 | Coppinger et al. | 709/206 |
| 2004/0177120 A1* | 9/2004 | Kirsch | 709/206 |
| 2005/0102361 A1* | 5/2005 | Winjum et al. | 709/206 |

FOREIGN PATENT DOCUMENTS

| | | |
|---|---|---|
| JP | 2001337904 | 12/2001 |
| JP | 2002082887 | 3/2002 |
| WO | 0067133 | 11/2000 |

OTHER PUBLICATIONS

Frees et al.; PRISM Interaction for Enhancing Control in Immersive Virtual Environments; ACM Transactions on Computer-Human Interaction, vol. 14, No. 1, Article 2; May 2007; 31 pages.

* cited by examiner

To: _____
Subject: _____
Cc: _____
Bcc: _____
Attachment: _____
  35

Send
Reply
Reply All
Forward
Delete

MANAGING LOCALLY INITIATED ELECTRONIC MAIL ATTACHED DOCUMENTS

FIELD OF THE INVENTION

The present invention relates to a method and system for managing document attachments the are received as part of electronic messages and in particular to a method and system for determining when documents attached to electronic mail messages are from locally generated electronic messages and then for managing the storage of these locally generated attachment documents.

BACKGROUND OF THE INVENTION

Electronic mail (email) communications are an integral part of any business, and widely used outside of business as well. Although several new technologies currently compete, as the most ubiquitous tool in business communications, email remains one of the single most used communications tools for both the business and the personal user. Widespread availability, ease of use, and functionality are key components which hold email in front of developing communications methods; however, as new technologies compete for the top spot, email applications must continue to build upon the strong foundation currently in place to maintain their edge as the tool of choice. By any current standard, email applications would have to be rated as mature technology; however, if improvements in email applications cease to move forward, and other tools continue to improve, loss of market share will undoubtedly result. One key feature missing in legacy email tools is efficient management of locally sourced electronic mail attachments.

Often, electronic mail messages have documents attached to the message. During the process of creating the electronic message, the user has the option to attach a document to the created message. When the user attaches a document to the message, this attachment process often creates another copy of the attached document. With some electronic mail systems, a copy of each transmitted message is also saved on a mail server. The document attached the message is also saved with these message. In addition, some users choose to copy themselves on messages that they transmit. In theses cases, the attached documents are also copied and stored with the message. As a result, in many cases, the transmission of attachment documents with electronic mail messages creates multiple copies of the same document. These multiple copies occupy substantial memory or storage space in a system.

Storage space and processing cycles carry extensive cost to owning organizations, and as such, any optimization in this area is critical to a corporate cost structure. Legacy electronic mail systems do a poor job of managing replicate data in the form of locally sourced attachments, and as such, storage space is wasted, and system resources are stressed beyond functional need. When the creator of an electronic message locally sources an attachment document, there is no need for the electronic mail system to store additional copies of the attached document. Conventional legacy electronic mail systems, by default, will save between three (3) to six (6) copies of the same locally sourced attachment document through poor replication management processes.

Therefore, there remains a need for a method and system that can better manage the creation and storage of multiple copies of documents that are attached to electronic mail messages such that multiple unnecessary copies of these documents are not created and storage space is more efficiently used as a result of the reduction and elimination of the unnecessary attachment documents.

SUMMARY OF THE INVENTION

It is an objective of the present invention to provide a method and system to manage the transmission of documents attached to electronic mail messages.

It is a second objective of the present invention to control the creation of copies of documents attached to electronic mail messages during the process of transmitting these messages containing the attached document.

It is a third objective of the present invention to provide a method and system to manage the storage of attachment documents at the origination location of an electronic mail message containing the attached document.

It is a fourth objective of the present invention to provide a method and system to manage documents attached to electronic mail messages by providing links from the electronic message to the original document that is attached to the electronic mail message.

The present invention introduces unique functionality whereby there is a substantial reduction in the storage space and replication requirements for the locally initiated electronic mail messages, which include locally sourced attachments. This invention reduces both the over all storage requirements for electronic messages with locally sourced attachments and also improves the efficiency of the electronic mail system as a whole.

In the method of the present invention, there is an identification of electronic messages containing locally sourced attachment documents. As part of the transmission of these messages, a copy of the transmitted message can be stored either automatically or by choice of the message sender. During the storage of the transmitted message, there is determination of whether any attachment to the message was a locally sourced attachment. If the attachment was a locally sourced attachment, the attachment may not be stored with the message. Instead a pointer or link can be created to the original or locally sourced document. The method of the present invention is applicable to transmitted electronic messages that are automatically copied, to messages in which the sender carbon copies (CC) himself or herself or other optional storage mechanisms.

DESCRIPTION OF THE DRAWINGS

FIG. 3*a* is an illustration of a screen for a typical electronic message transmission.

DETAILED DESCRIPTION OF THE INVENTION

Figure 1:
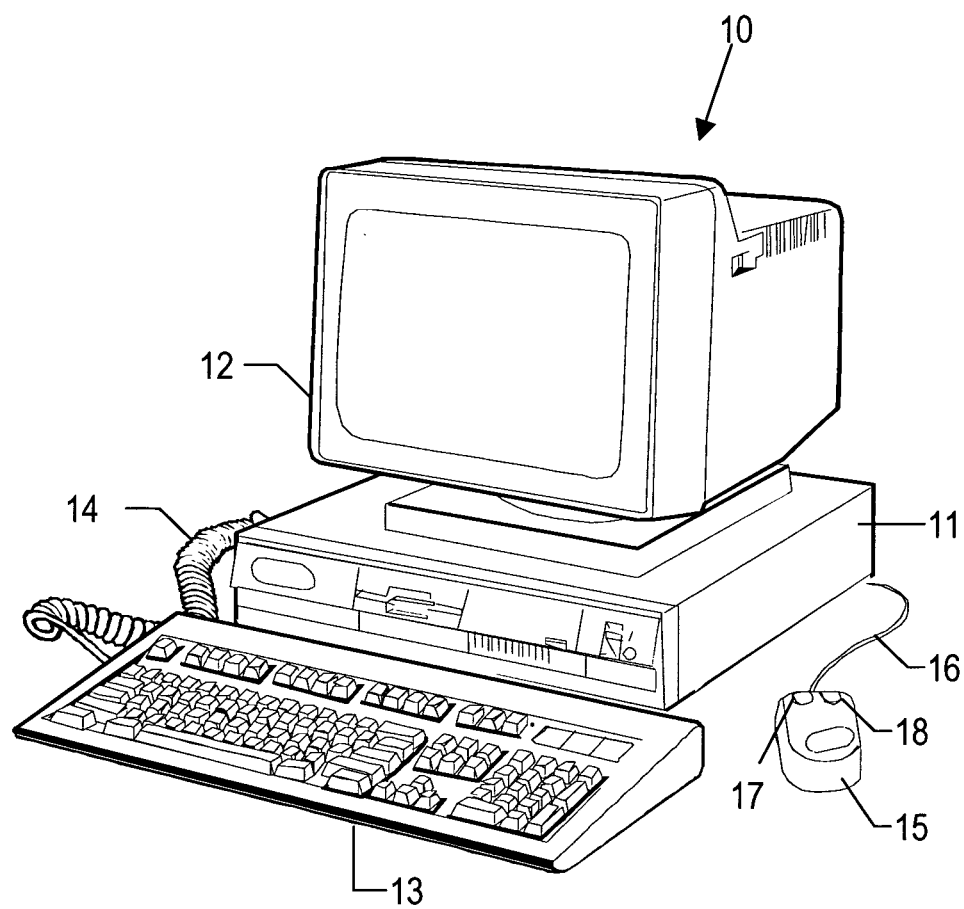
FIG. 1 is a conventional computing device used that can be used to transmit and receive electronic messages via a computer network.

Electronic mail message transmissions occur over computing devices, usually personal computers, connected to a communication network. With reference now to FIG. 1, there is depicted a pictorial representation of computing device 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

The method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
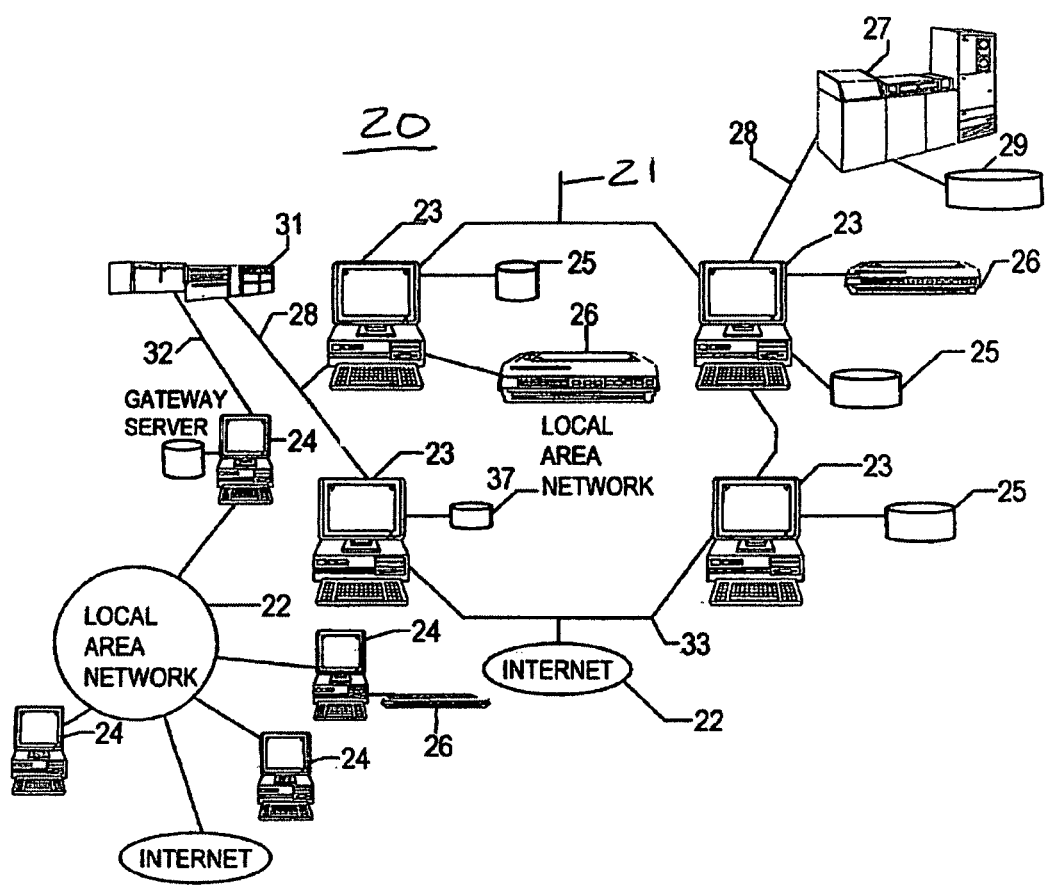
FIG. 2 is a diagram of a computer network over which electronic messages may be transmitted between a sender and receiver in the present invention.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

In the implementation of the present invention, logic is added to electronic mail applications that will enable these applications to distinguish between locally sourced or locally created attachments, and existing or inbound attachments. Additionally, a tracking/linking mechanism is added for the locally sourced attachment document. The logic necessary to implement the present invention falls in the field of document metadata management. Those skilled in the art recognize the feasibility of incorporating the present functionality via manipulation of existing metadata management techniques. Additionally, the it is recognized that many embodiments of this invention are possible, and the following representations are for illustrative purposes only, and in no way limit other possible implementation techniques.

Referring to FIG. 3a, there is an illustration of a typical screen during the creation of an electronic message. As shown, there is a text section 94 for the message and the standard party and subject information: To, Subject, Cc, and Bcc. In addition, there are control icons that allow a sender certain options before and during the transmission of the message. The icons can include Send, Reply, Reply All, Forward and Delete. Also shown is an attachment icon 35. As previously mentioned, this attachment option enables the sender to attach a document to the electronic message.

Figure 3B:
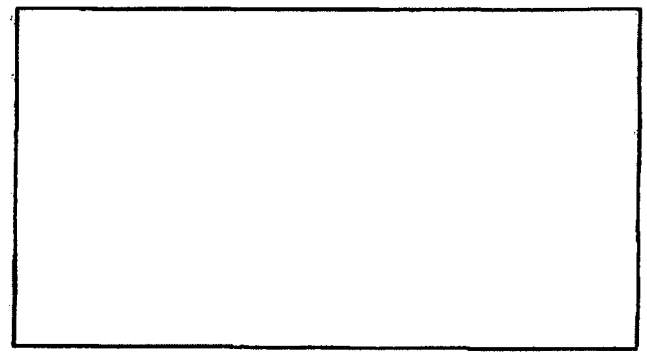
FIG. 3*b* is an illustration of a screen menu for an attachment option for the creator of an electronic message.
Figure 3C:
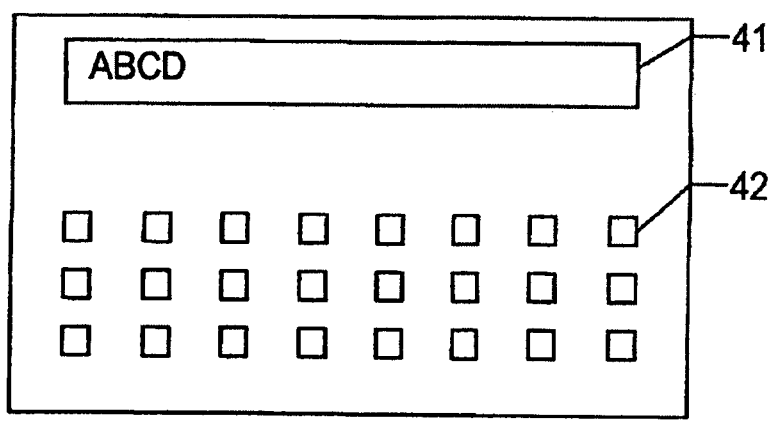
FIG. 3*c* is an illustration of a typical directory of documents for attachment.

When a user selects the Attachment icon 35, a menu of options connected with the process of attaching a document to the message can appear on the user's screen. Referring to FIG. 3b, shown is a popup screen containing a menu of options for attaching a document to a message. As shown, there are icons for different steps in this attachment process. The Browse icon 36 allows enables the sender to view and search through various directories and files in order to find the desired document. FIG. 3c shows a typical screen of documents that a sender views when searching for the desired document to attach. A particular directory 41 ABCD contains several documents 42 from which the send can choose to attach.

Referring back to FIG. 3b, after the sender has selected a document for attachment, the sender will click the attach icon 97. At this point, the there will be a listing of the attached document on the screen. If the sender is satisfied with this attached document, the sender can click the OK icon 38 to confirm the attachment of this document. If the sender decides to send a different document, the sender can click the detach icon 39 to remove the previously attached document from the electronic message. If the sender decides not to attach a document to the message, the sender can click the cancel icon 40, and return to the main message screen shown in FIG. 3*a*.

Figure 4:
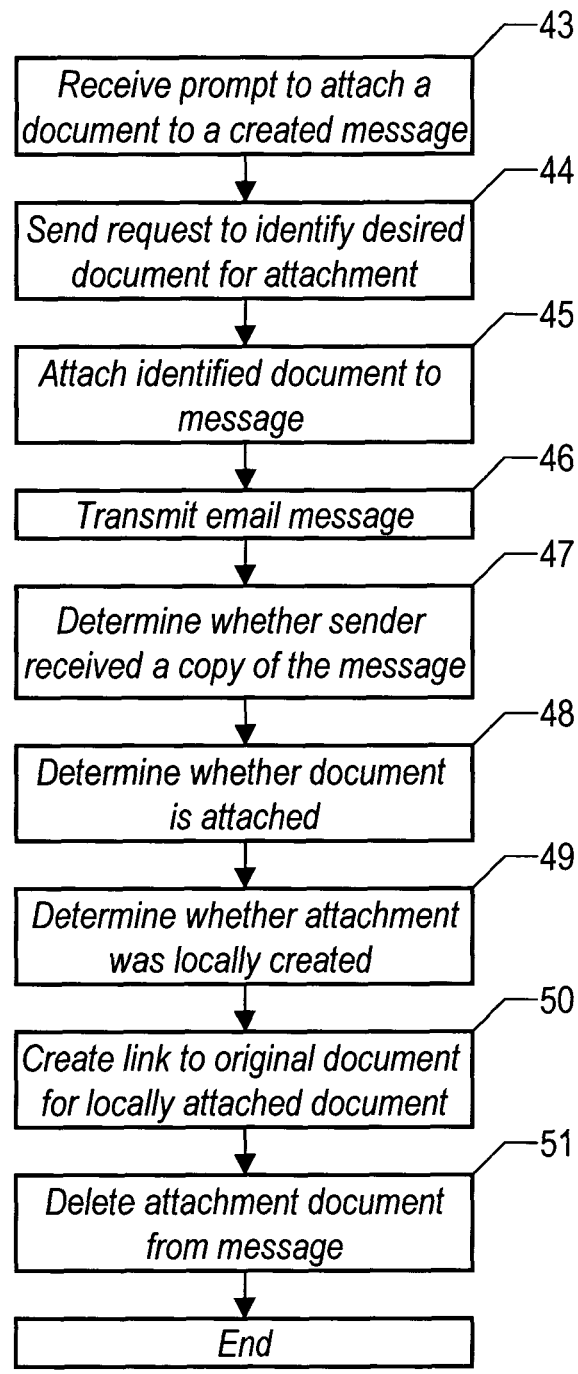
FIG. 4 is a flow diagram illustrating the general steps in the method the present invention.

FIG. 4 illustrates the general steps in the method the present invention. A sender is in the process of composing an electronic message for transmission. The sender now desires to attach a document to the message. The sender clicks the attachment icon 35. When the sender clicks the attachment icon, in step 43, the method of the present invention receives a prompt to attach a document to the created message. Step 44 sends a request prompt to the message sender to identify the document that the sender wants to attach. This request results in the display of the popup screen shown in FIG. 3*b*. When the sender selects the desired document for attachment, step 45 attaches this document to the message. This attachment step will result in the display of the selected document on the sender's screen. After the attachment of the document, the sender may perform other tasks to complete the preparation of the message. If the sender has completed the message preparation, step 46 transmits the electronic message and attached document to the designated recipient. Once the message has arrived the designate destination, step 47 will determine whether any copies of the message were transmitted to the sender. Examples of transmissions to the sender include carbon-copy (cc), blind carbon-copy (bcc) transmissions and automatic copying of any transmitted messages. If there is a determination that the sender did receive a copy of the transmitted message, step 48 determines whether there is an attached document with the message. This step is necessary because some electronic mail systems do not copy the attachments that are transmitted with a document. If there was an attachment to a message copied to the sender, there is a determination of the origin of any document attached to the message in step 49. If the determination is that the sender originated the document locally, step 50 will create a link to the local document that was the source of the attached document. The last step 51 in this method would be to delete the attached document from the copied message, which would make available storage space that the copied attached document would occupy.

Figure 5:
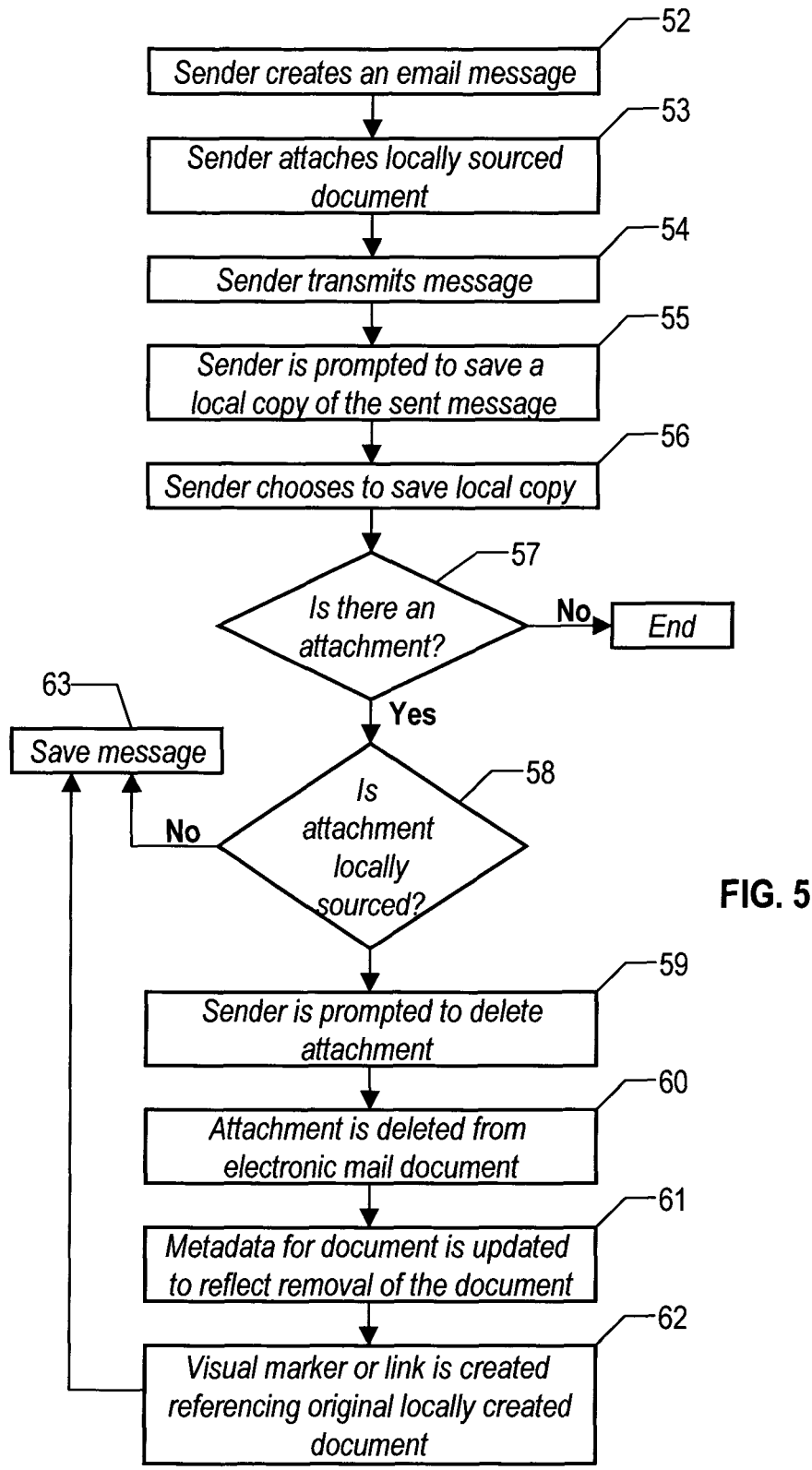
FIG. 5 is a flow diagram illustrating detailed steps in the method of the present invention.

FIG. 5 illustrates an embodiment of the present invention that can be implemented in electronic mail systems where the sender controls the copying of transmitted messages at the sender's workstation. The initial steps in this method are similar to the steps described in FIG. 4. In step 52, the sender creates an electronic message. The sender, in step 53, attaches a locally sourced document to the created message. In step 54, the message is sent to the designated destination. Depending on the type of electronic mail system, in step 55, the sender may receive an inquiry to determine if the sender desires to save a copy of the transmitted message. Although not shown, if the sender indicates a desire to save a copy of the message, a popup screen could give a menu of available options from which the sender can choose to save the message. If the sender chooses to save the message in step 56, there is determination in step 57 of whether there is an attached document to the message. If no document is attached to the message, the message is saved as desired by the sender. When there is an attached document, step 58 makes a determination of whether the attachment is locally sourced. This determination can be done by comparing the attachment document name to the documents stored at the origination location of the original email message. If there is a match between the attachment document and a stored document, the determination is that the attachment document was a locally sourced document. If the determination is that the attachment is locally sourced, step 59 sends a prompt to the sender to delete the attachment from the message. In step 60, the sender deletes the attached document. In step 61, metadata for the document is updated to reflect the removal of the document from the message. In step 62, the visual marker or link is created in the saved message that references the original locally sourced document. This linked document could be the document identified in step 58.

Some electronic mail systems contain attachment databases where all desired attachments are detected and stored. While this is useful tool for inbound attachments, it is unnecessary and inefficient for locally stored attachment documents. When an initiating user already has the locally-sourced attachment document in his file structure, previously stored in the directory of his choice, it is much more efficient to simply leave the document in place and reference it from within the locally stored electronic mail message. No additional storage of the document in an attachment database is required, and it is much easier for the local user to find a given document in a logically selected local file structure than in a single database filled with unrelated documents of all types. Referring again to FIG. 5, in step 63, the electronic mail message is stored in a legacy manner.

Figure 6:
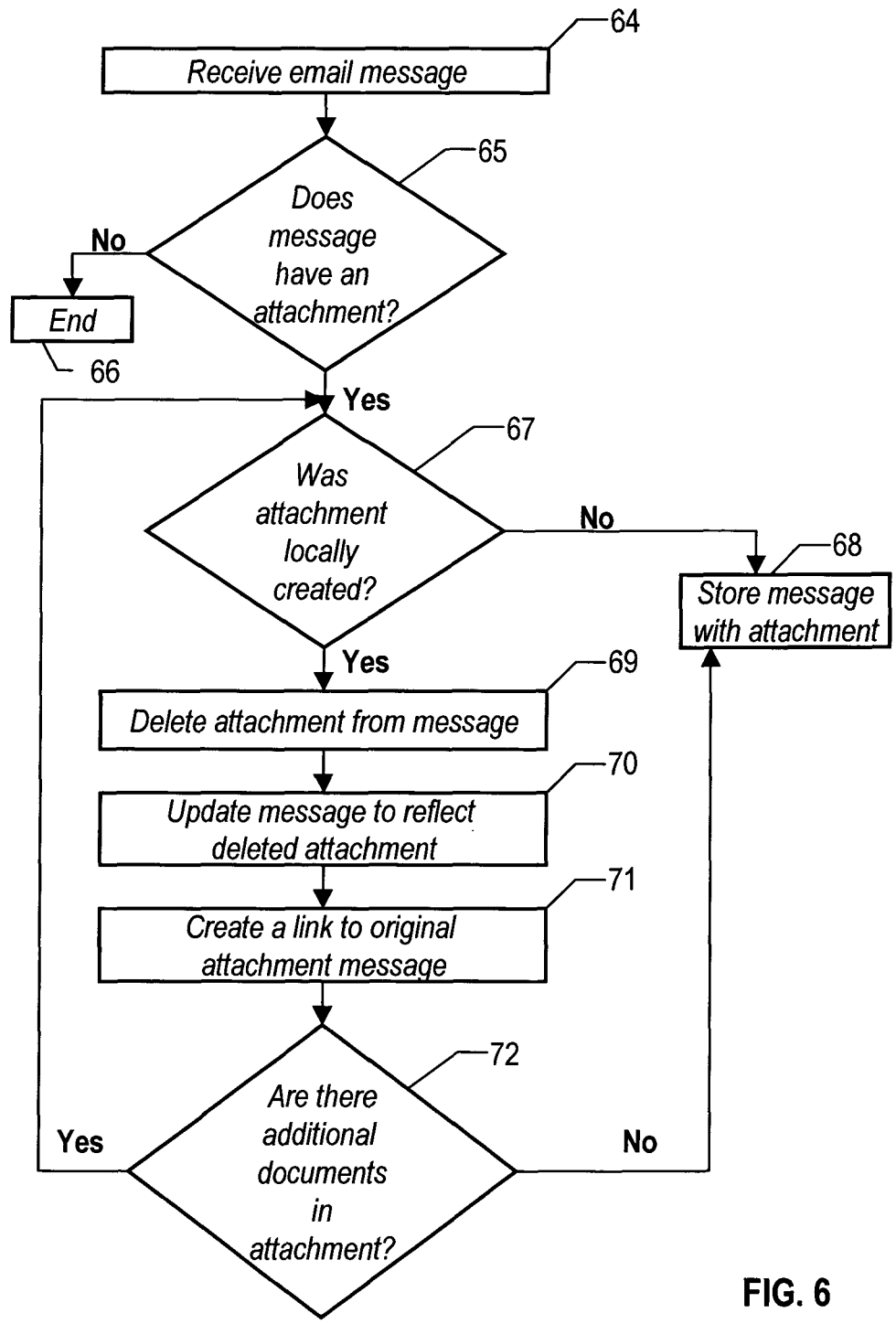
FIG. 6 is a flow diagram of an alternate embodiment of the present invention, which includes steps for handling electronic mail messages with attachments that contain multiple documents.

FIG. 6 is a detailed flow diagram of the steps following the receipt at the sender location of an electronic message, which may contain multiple attached documents. In this method, step 64 receives an electronic message. Step 65 makes a determination whether the message has an attachment. If there is no attached document, the method terminates at block 66. If, in step 65, there is a determination that there is an attached document, step 67 makes a determination whether the attached document was locally originated. If the determination is that the document was not locally originated, the message with the attached document is stored in a predetermined location or as specified by the message recipient in step 68. If, however, the determination is that the message was locally originated, step 69 deletes the attached document from the received message. Step 70 then updates the message to reflect that an attachment was deleted from the message. Step 71 then creates a link from the message to the original document, which was attached to the message. Since there is a possibility of multiple documents in an attachment to a message, step 72 determines if there where additional documents in the attachment. If there are additional documents in the attachment, the method returns to step 67 and the steps 67 through 71 are repeated for each additional document in the attachment.

Figure 7:
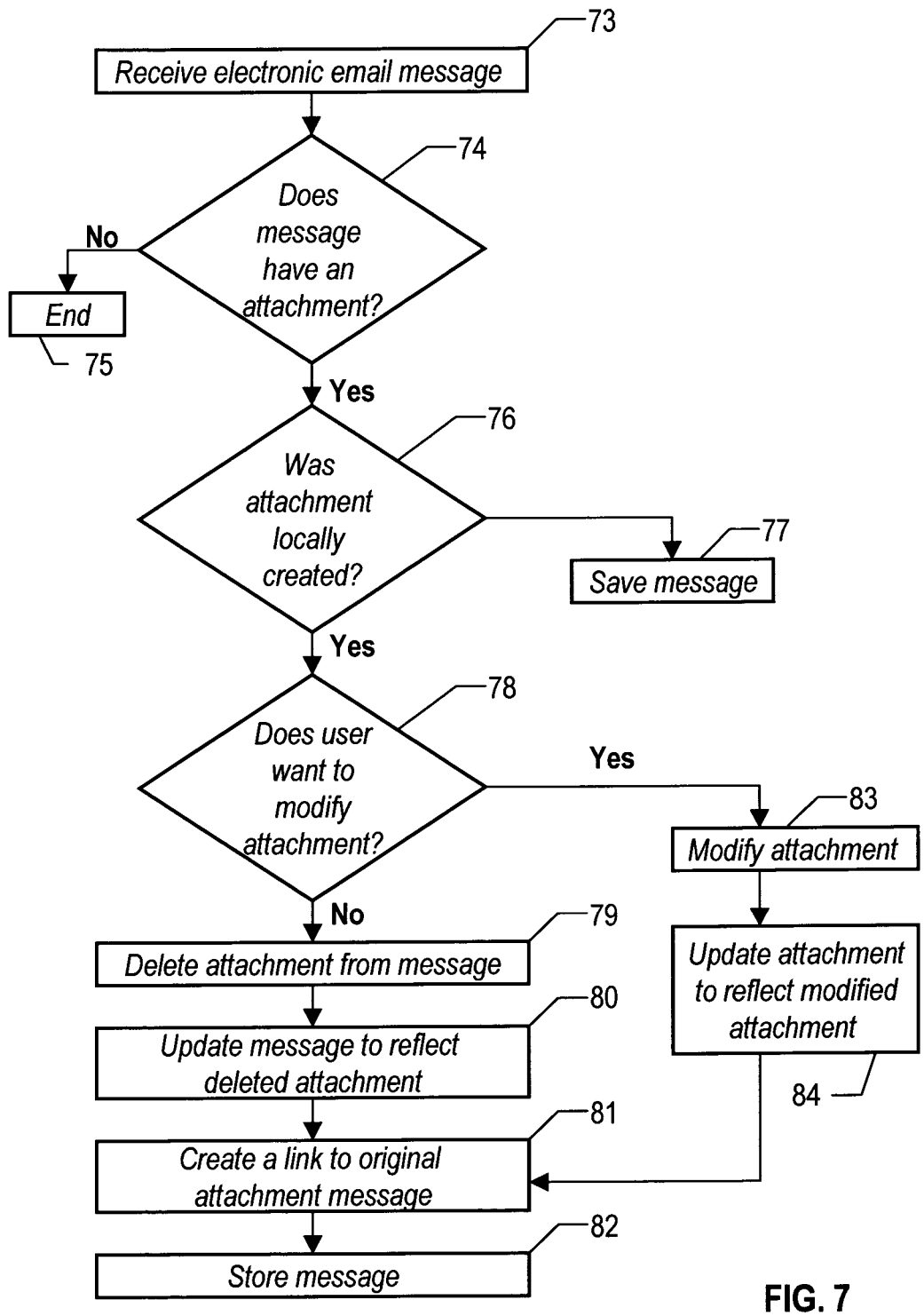
FIG. 7 is a flow diagram of an alternate embodiment of the present invention, which includes an option to modify the attached document in a received electronic mail message.

FIG. 7 is a flow diagram of an alternate embodiment of the present invention, which includes an option to modify the attached document in a received electronic mail message. The initial steps of this method are the same as in FIG. 6. In this method, step 73 receives an electronic message. Step 74 makes a determination whether the message has an attachment. If there is no attached document, the method terminates at block 75. If, in step 74, there is a determination that there is an attached document, step 76 makes a determination whether the attached document was locally originated. If the determination is that the document was not locally originated, the message with the attached document is stored in a predetermined location or as specified by the message recipient in step 77. If, however, the determination is that the message was locally originated, step 78 inquires whether recipient wants to modify the attachment to the message. If the recipient does not want to modify the attachment, the method deletes the attachment in step 79. Step 80 updates the message to reflect a deletion of the attachment to the message. After the message update, step 81 creates a link to the original document, which was attached to the electronic message. The process then stores the message in step 82.

Referring back to step 78, if the recipient desires to modify the attachment in the message, the method moves to step 83 where the modification process will occur. After the completion of the modification, the modified message is stored in step 84. Following this storage step, the message is updated to reflect a modification of the attachment. In the alternative, a there can be the creation of a new separate document that is the updated version of the attached document. After the message update, in step 81, a link is created to the original document from which was the source of the modified attachment. The process then stores the message in step 82.

To facilitate a link created between an electronic message and an original document, there can be a header or footer added to the original document to provide fields for pointers to electronic messages that have this document attached to the message. Furthermore, link would be different depending on whether the document was a copy of the original document or a modified copy of the original document.

Other options for features in the present invention can include extended note management functionality whereby attachment-to-mail associations are maintained and acted upon. As an example, if an electronic mail message with a locally sourced attachment reference is deleted, the application could generate a pop-up/warning that a document association exists. In the case where the attachment document was prepared specifically for the email message being deleted, it may also be desirable to delete the attachment as well, this functionality could be incorporated as well. Finally, if the attachment document itself is deleted, this could generate a warning noting the associated electronic mail message.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include storage media such as EPROM, ROM, tape, floppy disc, hard disk drive, RAM, and CD-ROMs and transmission-type of media, such as digital and analog communications links.

Having thus described the invention, what we claims as new and desire to secure by Letters Patent is set forth in the following claims.

We claim:

1. A method for managing documents attached to electronic mail messages, said method comprising:
a processor of a computer system receiving an electronic mail message at a destination location;
said processor determining that a document is attached to the received electronic mail message;
said processor determining that the attached document is stored at the destination location;
in response to said determining that the attached document is stored at the destination location, said processor deleting the document from the received electronic mail message;
in further response to said determining that the attached document is stored at the destination location, said processor creating in the received electronic mail message a link for connecting to the document stored at the destination location;
said processor generating a modified copy of the attached document that is attached to the electronic mail message;
said processor storing the modified copy;
after said generating the modified copy and said storing the modified copy, said processor updating the electronic mail message to reflect said generating the modified copy; and
after said updating the electronic mail message to reflect said storing the modified copy, said processor adding to the stored modified copy a header or footer that comprises a link to the electronic mail message.

2. The method of claim 1, said method further comprising:
after said deleting, said processor updating the electronic mail message to indicate that the document has been deleted from the electronic mail message.

3. The method of claim 1, said method further comprising:
said processor receiving, from a user at the destination location, a selection of the document stored at the destination location;
said processor creating the electronic mail message, said creating the electronic mail message comprising attaching the selected document to the electronic mail message; and
prior to said receiving the electronic mail message, said processor transmitting the electronic mail message to a plurality of recipients, wherein the user at the destination location is one recipient of the plurality of recipients, and wherein said receiving the electronic mail message at the destination location is in response to the user being one recipient of the plurality of recipients.

4. The method of claim 3, said method further comprising:
after said transmitting the electronic mail message, said processor determining that the user desires to save a copy of the transmitted electronic mail message;
in response to said determining that the user desires to save the copy of the transmitted electronic mail message, said processor deleting the document from the copy of the transmitted electronic mail message.

5. The method of claim 4, said method further comprising:
after said deleting the document from the copy of the transmitted electronic mail message, said processor (i) updating metadata for the document to indicate that the document has been deleted from the copy of the electronic mail message and (ii) creating in the copy of the electronic mail message a link configured to connect to the document stored at the destination location.

6. The method of claim 1, said method further comprising:
after said deleting the attached document from the received electronic mail message, said processor updating the electronic mail message to reflect said deleting the attached document from the received electronic mail message; and
after said updating the electronic mail message to reflect said deleting the attached document from the received electronic mail message, said processor adding to the attached document stored at the destination location a header or footer that comprises a link to the electronic mail message.

7. A computer program product, comprising a computer readable storage device having a computer readable program instructions stored therein, said program instructions configured to be executed by a processor of a computer system to implement a method for managing documents attached to electronic mail messages, said method comprising:
said processor receiving an electronic mail message at a destination location;
said processor determining that a document is attached to the received electronic mail message;
said processor determining that the attached document is stored at the destination location;

in response to said determining that the attached document is stored at the destination location, said processor deleting the document from the received electronic mail message;

in further response to said determining that the attached document is stored at the destination location, said processor creating in the received electronic mail message a link for connecting to the document stored at the destination location;

said processor generating a modified copy of the attached document that is attached to the electronic mail message;

said processor storing the modified copy;

after said generating the modified copy and said storing the modified copy, said processor updating the electronic mail message to reflect said generating the modified copy; and after said updating the electronic mail message to reflect said storing the modified copy, said processor adding to the stored modified copy a header or footer that comprises a link to the electronic mail message.

8. The computer program product of claim 7, said method further comprising:

after said deleting, said processor updating the electronic mail message to indicate that the document has been deleted from the electronic mail message.

9. The computer program product of claim 7, said method further comprising:

said processor receiving, from a user at the destination location, a selection of the document stored at the destination location;

said processor creating the electronic mail message, said creating the electronic mail message comprising attaching the selected document to the electronic mail message; and prior to said receiving the electronic mail message, said processor transmitting the electronic mail message to a plurality of recipients, wherein the user at the destination location is one recipient of the plurality of recipients, and wherein said receiving the electronic mail message at the destination location is in response to the user being one recipient of the plurality of recipients.

10. The computer program product of claim 9, said method further comprising:

after said transmitting the electronic mail message, said processor determining that the user desires to save a copy of the transmitted electronic mail message;

in response to said determining that the user desires to save the copy of the transmitted electronic mail message, said processor deleting the document from the copy of the transmitted electronic mail message.

11. The computer program product of claim 10, said method further comprising:

after said deleting the document from the copy of the transmitted electronic mail message, said processor (i) updating metadata for the document to indicate that the document has been deleted from the copy of the electronic mail message and (ii) creating in the copy of the electronic mail message a link configured to connect to the document stored at the destination location.

12. The computer program product of claim 7, said method further comprising:

after said deleting the attached document from the received electronic mail message, said processor updating the electronic mail message to reflect said deleting the attached document from the received electronic mail message; and after said updating the electronic mail message to reflect said deleting the attached document from the received electronic mail message, said processor adding to the attached document stored at the destination location a header or footer that comprises a link to the electronic mail message.

13. A computer system comprising a processor, a memory, and a computer readable storage device, said storage device containing program instructions configured to be executed by the processor via the memory to implement a method for managing documents attached to electronic mail messages, said method comprising:

said processor receiving an electronic mail message at a destination location;

said processor determining that a document is attached to the received electronic mail message;

said processor determining that the attached document is stored at the destination location;

in response to said determining that the attached document is stored at the destination location, said processor deleting the document from the received electronic mail message;

in further response to said determining that the attached document is stored at the destination location, said processor creating in the received electronic mail message a link for connecting to the document stored at the destination location;

said processor generating a modified copy of the attached document that is attached to the electronic mail message;

said processor storing the modified copy;

after said generating the modified copy and said storing the modified copy, said processor updating the electronic mail message to reflect said generating the modified copy; and after said updating the electronic mail message to reflect said storing the modified copy, said processor adding to the stored modified copy a header or footer that comprises a link to the electronic mail message.

14. The computer system of claim 13, said method further comprising:

after said deleting, said processor updating the electronic mail message to indicate that the document has been deleted from the electronic mail message.

15. The computer system of claim 13, said method further comprising:

said processor receiving, from a user at the destination location, a selection of the document stored at the destination location;

said processor creating the electronic mail message, said creating the electronic mail message comprising attaching the selected document to the electronic mail message; and prior to said receiving the electronic mail message, said processor transmitting the electronic mail message to a plurality of recipients, wherein the user at the destination location is one recipient of the plurality of recipients, and wherein said receiving the electronic mail message at the destination location is in response to the user being one recipient of the plurality of recipients.

16. The computer system of claim 15, said method further comprising:

after said transmitting the electronic mail message, said processor determining that the user desires to save a copy of the transmitted electronic mail message;

in response to said determining that the user desires to save the copy of the transmitted electronic mail message, said processor deleting the document from the copy of the transmitted electronic mail message.

17. The computer system of claim 16, said method further comprising:
   after said deleting the document from the copy of the transmitted electronic mail message, said processor (i) updating metadata for the document to indicate that the document has been deleted from the copy of the electronic mail message and (ii) creating in the copy of the electronic mail message a link configured to connect to the document stored at the destination location.

18. The computer system of claim 13, said method further comprising:
   after said deleting the attached document from the received electronic mail message, said processor updating the electronic mail message to reflect said deleting the attached document from the received electronic mail message; and
   after said updating the electronic mail message to reflect said deleting the attached document from the received electronic mail message, said processor adding to the attached document stored at the destination location a header or footer that comprises a link to the electronic mail message.

\* \* \* \* \*